US009630346B2

(12) United States Patent
Turng et al.

(10) Patent No.: US 9,630,346 B2
(45) Date of Patent: Apr. 25, 2017

(54) METHOD OF FABRICATING AN INJECTION MOLDED COMPONENT

(71) Applicant: Wisconsin Alumni Research Foundation, Madison, WI (US)

(72) Inventors: Lih-Sheng Turng, Madison, WI (US); Xiaofei Sun, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 449 days.

(21) Appl. No.: 13/785,563

(22) Filed: Mar. 5, 2013

(65) Prior Publication Data
US 2014/0252669 A1    Sep. 11, 2014

(51) Int. Cl.
| B29C 44/42 | (2006.01) |
| B29B 9/06 | (2006.01) |
| B29C 47/88 | (2006.01) |
| B29C 47/92 | (2006.01) |
| B29C 44/34 | (2006.01) |
| B29C 47/10 | (2006.01) |
| B29C 47/00 | (2006.01) |
| B29C 47/36 | (2006.01) |

(52) U.S. Cl.
CPC ............. *B29B 9/06* (2013.01); *B29C 44/348* (2013.01); *B29C 44/3461* (2013.01); *B29C 47/0011* (2013.01); *B29C 47/1072* (2013.01); *B29C 47/1081* (2013.01); *B29C 47/8895* (2013.01); *B29C 47/92* (2013.01); *B29C 44/3423* (2013.01); *B29C 44/3449* (2013.01); *B29C 44/42* (2013.01); *B29C 47/0004* (2013.01); *B29C 47/0014* (2013.01); *B29C 47/0066* (2013.01); *B29C 47/1063* (2013.01); *B29C 47/369* (2013.01); *B29C 2947/926* (2013.01); *B29C 2947/92704* (2013.01); *B29C 2947/92828* (2013.01); *B29C 2947/92895* (2013.01)

(58) Field of Classification Search
CPC .............. B29C 44/3423; B29C 44/348; B29C 44/3461; B29C 44/3449; B29C 44/42; B29C 47/1072; B29C 47/1063; B29C 47/1081; B29C 47/92; B29C 47/0004; B29B 9/06
USPC ... 264/51, 53, 328.17, 85, 176.1, 210.6, 211
See application file for complete search history.

(56) References Cited

U.S. PATENT DOCUMENTS

| 3,488,412 A | 1/1970 | Bielfeldt et al. |
| 3,575,931 A | 4/1971 | Sherman et al. |

(Continued)

OTHER PUBLICATIONS

Lee et al., "Novel Foam Injection Molding Technology Using Carbon Dioxide-Laden Pellets", Polymer Engineering and Science, 2011.*

(Continued)

*Primary Examiner* — Alison L Hindenlang
*Assistant Examiner* — Lawrence D Hohenbrink, Jr.
(74) *Attorney, Agent, or Firm* — Boyle Fredrickson, S.C.

(57) ABSTRACT

A method of fabricating an injection-molded component is provided. The method includes the step of introducing pellets into an injection barrel of an injection molding machine. The pellets include a first supercritical fluid. The pellets are plasticized in the injection barrel and a second supercritical fluid is injected into the plasticized pellets. The second supercritical fluid and the plasticized pellets are mixed to form a mixed material. The mixed material is injected into a mold.

18 Claims, 2 Drawing Sheets

(56) References Cited

U.S. PATENT DOCUMENTS

| | | | |
|---|---|---|---|
| 3,730,918 | A | 5/1973 | Teti et al. |
| 4,331,619 | A | 5/1982 | Chung et al. |
| 4,806,294 | A | 2/1989 | Lapierre et al. |
| 5,679,723 | A | 10/1997 | Cooper et al. |
| 5,837,177 | A | 11/1998 | DiNardo et al. |
| 6,103,255 | A | 8/2000 | Levene et al. |
| 6,221,924 | B1 | 4/2001 | Mori et al. |
| 6,228,898 | B1 | 5/2001 | Nakanishi |
| 6,306,424 | B1 | 10/2001 | Vyakarnam et al. |
| 6,322,347 | B1 | 11/2001 | Xu |
| 6,323,245 | B1 | 11/2001 | Ramesh |
| 6,333,029 | B1 | 12/2001 | Vyakarnam et al. |
| 6,335,378 | B1 | 1/2002 | Colman |
| 6,365,149 | B2 | 4/2002 | Vyakarnam et al. |
| 6,534,084 | B1 | 3/2003 | Vyakarnam et al. |
| 6,626,950 | B2 | 9/2003 | Brown et al. |
| 6,692,761 | B2 | 2/2004 | Mahmood et al. |
| 6,746,685 | B2 | 6/2004 | Williams |
| 6,773,713 | B2 | 8/2004 | Bonassan et al. |
| 6,852,330 | B2 | 2/2005 | Bowman et al. |
| 6,884,428 | B2 | 4/2005 | Binette et al. |
| 7,098,292 | B2 | 8/2006 | Zhao et al. |
| 7,112,417 | B2 | 9/2006 | Vyakarnam et al. |
| 7,144,926 | B2 | 12/2006 | Galaton |
| 2002/0091226 | A1 | 7/2002 | Nichols et al. |
| 2004/0010048 | A1 | 1/2004 | Evans et al. |
| 2004/0026811 | A1 | 2/2004 | Murphy et al. |
| 2005/0107868 | A1 | 5/2005 | Nakayama et al. |
| 2005/0165475 | A1 | 7/2005 | Noh |
| 2005/0187322 | A1 | 8/2005 | Park et al. |
| 2006/0002978 | A1 | 1/2006 | Shea et al. |
| 2006/0083771 | A1 | 4/2006 | Yamamoto et al. |
| 2006/0153814 | A1 | 7/2006 | Liao et al. |
| 2006/0264599 | A1 | 11/2006 | Anno et al. |
| 2007/0176313 | A1* | 8/2007 | Ogawa ............... B29C 44/12 264/51 |
| 2009/0017094 | A1* | 1/2009 | Turng ............... A61L 27/48 424/426 |
| 2009/0082507 | A1 | 3/2009 | Egashira et al. |
| 2012/0061867 | A1* | 3/2012 | Dougherty, Jr. .... B29C 44/3461 264/13 |

OTHER PUBLICATIONS

Nalawade SP, Picchioni F, Janssen LPBM (2006) "Supercritical Carbon Dioxide as a Green Solvent for Processing Polymer Melts: Processing Aspects and Applications", Prog Polym Sci 31:19-43, 27.*

Haugen et al, "A Novel Processing Method for Injection-Molded Polyether-Urethane Scaffolds. Part 1: Processing", Wiley InterScience (www.interscience.wiley.com) DO1: 10.1002/jbm.b. 30396, Oct. 20, 2005, pp. 65-72.

Shao, Xin Xin et al, "Evaluation of a hybrid scaffold/cell construct in repair of high-load-bearing osteochondral defects in rabbits", Biomaterials 27 (2006) pp. 1071-1080.

Nho, Shane J. et al, "Patellofemoral Osteochondral Autologous Transfer, Techniques in Knee Surgery", 5(2), pp. 134-137, 2006.

Mikos, Antonios G. et al, Preparation and characterization of poly (L-lactic acid) foams, Polymer, vol. 35, No. 5, 1994, pp. 1068-1077.

Mooney, David J. et al, "Novel approach to fabricate porous sponges of poly (D,L-lactic-coglycolic acid) without the use of organic solvents", Biomaterials 17 (1996), 1417-1422.

Nam, Yoon Sung et al, "A novel fabrication method of macroporous biodegradable polymer scaffolds using gas foaming salt as a porogen additive", Journal of Biomedical Materials Research (Applied Biomaterials) 53:1-7, 2000.

Harris, Leatrese et al, "Open Pore Biodegradable matrices formed with gas foaming", Journal of Biomedical Materials Research, vol. 42, No. 3, Dec. 5, 1998, pp. 396-402.

Washburn, Newell R. et al, "Co-extrusion of biocompatible polymers for scaffolds with co-continuous morphology", Journal of Biomedical Materials Research, vol. 60, No. 1, pp. 20-29.

Wang, Xiaoxi et al, "Solvent Free Fabrication of Biodegradable Porous Polymers", Proceedings of Imece04, pp. 595-602, 2204, American Society of Mechanical Engineers, New York, NY.

Wu, Linbo et al, "A 'room-temperature' injection molding/particulate leaching approach for fabrication of biodegradable three-dimensional porous scaffolds", Biomaterials, 27 (2006), pp. 185-191.

Leicher, S. et al, "MuCell(R) technology for injection molding: A processing method for polyether-urethane scaffolds", Journal of Materials Science, 40 (17): 4613-4618.

Reignier, Joel et al, "Preparation of Interconnected Polycaprolactone Porous Scaffolds by a Combination Polymer and Salt particulate Leaching", Proceedings of ANTEC 2005, pp. 2550-2554.

Neves, Nuno M. et al, "The morphology, mechanical properties and ageing behavior of porous injection molded starch-based blends for tissue engineering scaffolding", Materials Science & Engineering, C25 (2205) pp. 195-200.

Lee, J.J. et al., Improvement in Surface Quality of Microcellular Injection Molded Parts, ANTEC 2009, p. 1662.

Michaeli, W. et al., "Profoam—A New Foaming Process for Injecting Molding", ANTEC 2008, p, 1019.

Saucceau, M. et al., "New challenges in polymer foaming: A review of extrusion processes assisted by supercritical carbon dioxide", Progress in Polymer Science 36 (2011) 749-766.

Gale, M., "Foam extrusion of engineering and commodity polymers using carbon dioxide as a blowing agent", British Plastics and Rubbers, 2000, p. 4.

Pfannschimidt, O. et al., "Foam Injection Molding of Thermoplastics Loaded With Carbon Dioxide Prior to Processing", ANTEC 1999, p. 2100.

Lee, J.J. et al., "Novel Foam Injection Molding Technology Using Carbon Dioxide-Laden Pellets", Polymer Engineering and Science, 2011, DOI: 10.1002/pen.22004.

S.G.Kim et al., Foamability of Thermoplastic vulcanizates (TPVs) with Carbon Dioxide and Nitrogen, Cellular Polymers; 2006; 25, 1, p. 19.

G. Li et al., "Measurement of Gas Solubility in Linear/Branched PP Melts", J. Poly. Sci. Part B—Poly. Phy., 2007, 45, p. 2497.

E. Di Maio et al., "Structure Optimization of Polycaprolactone Foams by Using Mixtures of CO2 and N2 as blowing Agents", Polymer Engineering and Science, 45, 32 (2005).

Wong, A. et al., In Situ Observations of Polystyrene Foaming Processes with Carbon Dioxide Nitrogen Gas Blends, ANTEC 2011.

Crank J., "The Mathematics of Diffusion", Oxford University, Press, United Kingdom 1975.

Flumerfelt, R. et al., "Nitrogen Solubilities in Low-Density Polyethylene at High Temperatures and High Pressures", Journal of Applied Polymer Science, vol. 58, 2213-2219 (1995).

Areerut, S. et al., "Measurement and Prediction of Diffusion Coefficients of Supercritica CO2 in Molten Polymers", Polymer Engineering and Science, Oct. 2004, vol. 44, No. 10, p. 1915.

J.J. Lee et al., "A novel method for improving the surface quality of microcellular injection molded parts", Polymer 52 (2011) 1436-1446.

M. Volmer et al., "Keimbildung in ubersattigten Gebilden", Z., Phys. Chem., 1926, 119, p. 277.

D.L. Tomasko et al., "Development of CO2 for polymer foam applications", J. of Supercritical Fluids 47 (2009) 493-499.

J.S. Colton et al., "The Nucleation of Microcellular Thermoplastic Foam with Additives: Part I: Theoretical Considerations", Polym. Eng. Sci., Mid-Apr. 1987, vol. 27, No. 7, p. 485.

J.S. Colton et al., :The Nucleation of Microcellular Thermoplastic Foam With Additives: Part II: Experimental Results and Decisions, Polym. Eng. Sci., Mid-Apr. 1987, vol. 27, No. 7, p. 493.

Hasan et al., "PVT Behaviors of Polystyrene in Presence of CO2+N2 Blends", ANTEC 2011.

Zhang, CL et al., "Extruded polystyrene foams with bimodal cell morphology", Polymer 53 (2012) 2435-2442.

(56) References Cited

OTHER PUBLICATIONS

Gendron et al., "Foaming polystyrene with a mixture of CO2 and ethanol", J. Cellu. Plast., 2006 42, 127.

* cited by examiner

METHOD OF FABRICATING AN INJECTION MOLDED COMPONENT

FIELD OF THE INVENTION

This invention relates generally to injection molding, and in particular, to a method for fabricating a foamed injection molded component with better surface quality and lower weight than prior components.

BACKGROUND AND SUMMARY OF THE INVENTION

Methods for processing plastic, especially thermoplastics, to make personal and consumer items and packaging typically utilize one or more polymers and employ techniques such as injection molding, blow molding, extrusion, and thermoforming. Microcellular techniques are employed to disperse gases in the polymer, thereby resulting in the polymer being "foamed." The "foamed" polymer includes a preset amount of dissolved gas that, when heated and processed, emerges from the plastic item or packaging in the form of bubbles or voids.

Microcellular injection molding is an emerging special injection molding process capable of producing foamed parts with many advantages. During the microcellular injection molding process, a supercritical fluid is introduced into a molten polymer prior to the polymer being injected into a mold. The polymer solidifies in the mold to form a desired component. The introduction of the supercritical fluid prior to injection of the polymer into the mold causes tiny bubbles to be distributed throughout the molded component. By providing tiny bubbles in the molded component, the amount of material necessary to mold the component is reduced, while the dimensional stability of the molded component is improved. Hence, this microcellular injection molding process allows for the production of lightweight and dimensionally stable plastic components with complex geometries while reducing the amount of raw material.

While the microcellular injection molding process saves on material cost and improves production efficiency as compared to conventional solid injection molding, the process does have certain limitations. By way of example, microcellular injection molding requires specially designed supercritical fluid delivery and dosing systems to be installed on the injection molding machine for the delivery of the supercritical fluid as a physical blowing agent. In addition, modifications need to be made to the injection molding machine itself, including the installation of a supercritical fluid delivery device and a special injection screw with mixing elements for effectively mixing the supercritical fluid with the liquid polymer. These two factors lead to an increase in capital investment, especially when a large number of injection molding machines need to be modified.

Alternatively, other methodologies may be used to produce foamed molded parts. By way of example, chemical blowing agents can be used to produce foamed injection molded parts without the need of installing any additional equipment on the injection molding machine. However, residuals tend to appear in the parts after the reaction, which leads to the degradation of the polymer matrix and to possible contamination of the mold. Furthermore, the use of chemical blowing agents does not allow for good control over the foaming process or the cellular foam structure of the parts. In addition, chemical blowing agents are not suitable for processing high temperature polymers due to its early decomposition.

A still further way to produce, foamed injection molded parts using a conventional injection molding machine is to saturate pellets of a polymer with a physical blowing agent in a high pressure vessel prior to introduction of the polymer into the injection molding machine. While parts with a cellular foam structure can be manufactured utilizing this methodology, the production rate of pre-saturated pellets using a high pressure vessel is usually not high enough for continuous mass production of injection molded parts.

Therefore, it is a primary object and feature of the present invention to provide a method for fabricating foamed, injection molded components in a cost-effective way while ensuring a satisfactory production rate.

It is a further object and feature of the present invention to provide a method for fabricating foamed injection molded components which produces components having smaller cell size and increased cell density over components produced by current methods.

It is a still further object and feature of the present invention to provide a method for fabricating foamed, injection molded components which produces lightweight components with comparable properties as those produced by current methods, but at a lower cost.

It is a still further object and feature of the present invention to provide a method for fabricating foamed, injection molded components which is simple and which may be performed with standard injection molding machinery.

In accordance with the present invention, a method of fabricating an injection-molded component is provided. The method includes the step of introducing pellets including a first supercritical fluid and polymeric material into an injection barrel of an injection molding machine. The pellets are plasticized within the injection barrel and a second supercritical fluid is introduced into the plasticized pellets to form an injection material. The injection material is injected into a mold.

The method may include the additional steps of providing a polymeric material. The polymeric material is heated and the first supercritical fluid is introduced to produce a melt. The melt is extruded and cooled rapidly to solid strands. The strands are then pelletized. The extruded melt is unfoamed. It is contemplated for the first supercritical fluid to be nitrogen and for the second supercritical fluid to be carbon dioxide. The injection material may be mixed prior to injecting the injection material into the mold. The injection molding machine includes a hopper communicating with the injection barrel. The pellets are introduced into the hopper prior to introduction of the pellets into the injection barrel.

In accordance with a further aspect of the present invention, a method of fabricating an injection-molded component is provided. The method includes the steps of providing a polymeric material and introducing a first supercritical fluid into the polymeric material. Pellets are formed from the polymeric material and the first supercritical fluid. The pellets are introduced into an injection barrel of an injection molding machine and the pellets are plasticized. A second supercritical fluid is introduced into the plasticized pellets to form an injection material. The injection material is injected into a mold.

The step of forming pellets from the polymeric material and the first supercritical fluid may include the additional steps of heating the polymeric material and introducing the first supercritical fluid to produce a melt. The melt is extruded and the cooled rapidly to form solid strands. The strands are introduced into a pelletizer. The extruded melt is unfoamed. It is contemplated for the first supercritical fluid to be nitrogen and the second supercritical fluid to be carbon dioxide.

The supercritical fluid is mixed into the plasticized material prior to injecting the injection material into the mold. The injection molding machine includes a hopper communicating with the injection barrel. The pellets are introduced into the hopper prior to introduction of the pellets into the injection barrel.

In accordance with a still further aspect of the present invention, a method of fabricating an injection-molded component is provided. The method includes the step of introducing pellets into an injection barrel of an injection molding machine. The pellets include a first supercritical fluid. The pellets are plasticized in the injection barrel and a second supercritical fluid and the plasticized pellets are mixed to form a mixed material. The mixed material is injected into a mold.

The pellets are formed from a polymeric material and the first supercritical fluid. The step of forming pellets from the polymeric material and the first supercritical fluid includes the steps of heating the polymeric material and introducing the first supercritical fluid to produce a melt. The melt is extruded and cooled to form solid strands. The strands are introduced into a pelletizer. The extruded melt is unfoamed. The first supercritical fluid may be nitrogen and the second supercritical fluid may be carbon dioxide. The injection molding machine includes a hopper communicating with the injection barrel. The pellets are introduced into the hopper prior to introduction of the pellets into the injection barrel.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF DRAWINGS

Figure 1:
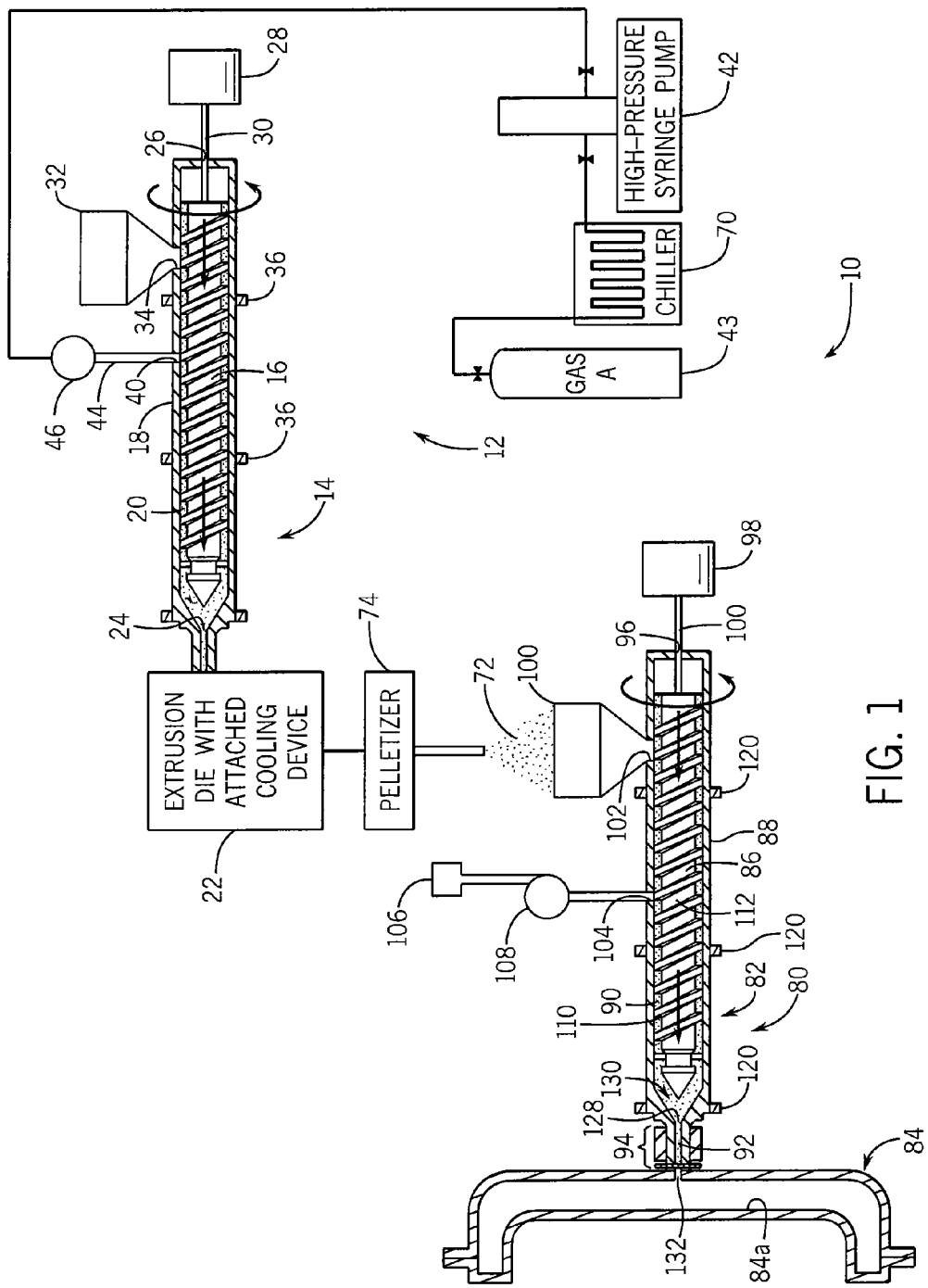
FIG. 1 is a schematic view of an injection molding machine for use in performing the methodology of the present invention.

Referring to FIG. 1, an apparatus for performing the methodology of the present invention is generally designated by the reference numeral 10. Apparatus 10 includes equipment set-up 12 for the production of supercritical fluid (SCF)-laden pellets. Set-up 12 includes extruder 14 having screw 16 extending along a longitudinal axis and being rotatably supported within barrel 18 to convey polymeric material downstream within polymer processing space 20 toward extrusion die 22. Seals (not shown) may be provided on the flights of screw 16, for reasons hereinafter described. Barrel 18 is adapted to receive polymeric materials that are fluidic, or can form a fluid that subsequently hardens to form a conventional, or solid, polymeric article or component. Barrel 18 includes a first end fluidly connected to mold extrusion die 22 through nozzle 24 and a second, opposite end having aperture 26 extending therethrough. Drive motor 28 is operatively connected to screw 16 by drive shaft 30 extending through aperture 26 in second end of barrel 18. Drive motor 28 is operatively connected to a controller (not shown) for controlling rotational and axial movement of screw 16.

Extruder 14 further includes hopper 32 for introducing a polymer material into barrel 18. The material in hopper 32 is delivered into polymer processing space 20 within barrel 18 through an orifice 34. Polymer processing space 20 is defined by the outer surface of screw 16 and the inner surface of barrel 18. It is noted that the polymer material may be in the form of solid pellets introduced through orifice 34 and plasticized within barrel 18. In connection with the present invention, it is noted a fluidic stream of polymeric material is established in the barrel 18.

A plurality of temperature control units 36 are positioned along barrel 18. For example, control units 36 can take any suitable form such as electrical heaters or the like. It is intended for control units 36 to heat a stream of pelletized or fluid polymeric material within barrel 18 to facilitate melting and/or cooling of the stream to control viscosity. If desired, control units 36 can operate differently at different locations along barrel 18.

Extruder 14 further includes at least one port 40 fluidly connecting syringe pump 42 to polymer processing space 20 within barrel 18. As hereinafter described, it is intended for a supercritical fluid to be injected into the polymeric material within the polymer processing space 18 to form a SCF-laden polymeric material therein. A pressure and metering device or injector 44 is provided between syringe pump 42 and the at least one port 40. In the preferred embodiment, injector 44 is configured as two cylinders, a smaller one with a tip on top of a larger diameter one. In this injector design, the tip has been removed, and it has a broad area, to allow more gas to penetrate through the Porcerax, which is a porous metallic alloy that allows the supercritical fluid to flow therethrough, while preventing the much more viscous polymer melt from leaking therein. As such, injector 44 may be used to meter the supercritical fluid introduced into the polymeric stream within barrel 18.

It is intend for syringe pump 42 to facilitate the flow of a blowing agent, namely, a liquid or supercritical fluid, (e.g. nitrogen or carbon dioxide) from source 43 to injector 44 at the low, constant flow rate. One exemplary syringe pump 42 is available as Model No. 260D from Teledyne ISCO of Lincoln, Nebr. Pressure regulator 46 and a pump controller (not shown) interconnects syringe pump 42 and injector 44 and controls the flow rate of the supercritical fluid provided thereto. In instances in which the supercritical fluid is carbon dioxide, chiller 70 interconnects source 43 and syringe pump 42. As the carbon dioxide flows from source 43 to syringe pump 42, chiller 70 acts to maintain the carbon dioxide in a liquid state under pressure, thereby facilitating the control over the flow rate and the pressure of the carbon dioxide supplied to injector 44. In instances in which the supercritical fluid is nitrogen, chiller 70 is unnecessary since control of the flow and pressure of thereof can be attained at or near ambient or room temperature.

In operation, it is contemplated to provide a polymeric material, e.g., polycarbonate, polystyrene, polypropylene or low-density polyethylene, in a pelletized form in hopper 32. At the beginning of a cycle, screw 16 is axially positioned adjacent the first end of barrel 18 in an initial position. The pelletized polymeric material in hopper 32 is delivered into polymer processing space 20 in barrel 18 through orifice 34. Screw 16 is rotated to urge the polymeric material downstream such that the mechanical energy generated by rotation of screw 16 and control units 36 plasticize the polymeric material in polymer processing space 20 in barrel 18. The first supercritical fluid is introduced into polymer processing space 20 through port 40 where it is mixed with the polymeric material via screw 16. Screw 16 maintains sufficient back pressure at all times to prevent premature foaming or the loss of pressure within extruder 14 which would allow the single phase solution to return to a two phase solution.

The seals located on the flights of screw 16 limit the escape of any supercritical fluid flashing off the plasticized polymeric material. In embodiments wherein LDPE (or similar thermoplastics) is used as the polymeric material, however, the solubility of the supercritical fluid increases with increasing melt temperatures. Hence, as the plasticizing of the polymeric material occurs, the supercritical fluid will likely remain in the LDPE. In other words, as long as the gas content is maintained below the saturation or super saturation point, the supercritical fluid does not escape from barrel 18.

Extrusion die 22 is configured such that the SCF-laden polymeric material will not foam or foam minimally before and after it exits nozzle of extruder 14. More specifically, extrusion die 22 is of sufficient length to facilitate the cooling of the SCF-laden polymeric material, thus suppressing the nucleation of bubbles therein. Also, to prevent the foaming from taking place prematurely, the temperature can be reduced further by cooling the SCF-laden polymeric material with vortex gas cooling tubes and/or extruding the SCF-laden polymeric material into a water bath. In the course of the operation of the equipment of the proposed set-up 12, the amount of supercritical fluid that can be added without premature foaming of the SCF-laden polymeric material can be determined experimentally. Other variables that ensure process stability, determine foaming rates, assess the shelf life of the SCF-laden pellets produced, and contribute to subsequent extrusion and injection molding processes can also be determined.

The SCF-laden polymeric material exits extrusion die 22 in strand form and cooled, e.g. by means of a water bath or, in the case of a water soluble polymeric material, vortex gas cooling tubes or an air blade. Thereafter, the strands of SCF-laden polymeric material are fed to pelletizer 74, wherein the strands are chopped or otherwise cut into suitably sized pellets 72. Pellets 72 are oven dried to remove the moisture content thereof. Once produced, pellets 72 are used by an injection molding machine to produce a desired component, as hereinafter described.

In order to form the component in accordance with the methodology of the present invention, apparatus 10 further includes an injection molding machine, generally designated by the reference numeral 80. Injection molding machine 80 includes extruder 82 fluidly connected to mold 84. Screw 86 extends along a longitudinal axis and is rotatably supported within barrel 88 to convey polymeric material downstream within polymer processing space 90 toward mold 84. Barrel 88 is adapted to receive polymeric materials that are fluidic, or can form a fluid that subsequently hardens to form a conventional, or solid, polymeric article. Barrel 88 includes a first end fluidly connected to mold 84 through nucleating pathway 92 of nucleator 94 and a second, opposite end having aperture 96 extending therethrough. Drive motor 98 is operatively connected to screw 86 by drive shaft 100 extending through aperture 96 in second end of barrel 88. Drive motor 98 is operatively connected to a controller (not shown) for controlling rotational and axial movement of screw 86.

Injection molding machine 80 includes hopper 100 for receiving pellets 72 of the pelletized SCF-laden polymeric material therein. Pellets 72 are delivered into polymer processing space 90 within barrel 88 through orifice 102. Polymer processing space 90 is defined by the outer surface of screw 86 and the inner surface of barrel 88. Injection molding machine 80 further includes at least one foaming agent port 104 fluidly connecting foaming agent source 106 to polymer processing space 90 within barrel 88. As hereinafter described, it is intended for a foaming agent to be injected into the plasticized polymeric material within the polymer processing space 88 to form a polymer and foaming agent solution therein. Pressure and metering device 108 is provided between foaming agent source 106 and the at least one foaming agent port 104. Pressure and metering device 108 may be used to meter the foaming agent so as to control the amount of the foaming agent in the polymeric stream within barrel 88 and maintain the foaming agent at a desired level.

Although foaming agent port 104 may be located at any of a variety of locations along barrel 88, it is preferably located just upstream from mixing section 110 of screw 86 and from foaming agent receiving section 112 of screw 86 wherein screw 86 includes unbroken flights. Mixing section 110 is adapted for mixing the foaming agent and SCF-laden polymeric material to promote the formation of a single-phase solution of the SCF-laden polymeric material and the foaming agent within barrel 88.

A plurality of temperature control units 120 are positioned along barrel 88. For example, control units 120 can take any suitable form such as electrical heaters or the like. It is intended for control units 120 to heat a stream of pelletized or fluid polymeric material within barrel 88 to facilitate melting and/or cooling of the stream to control viscosity and, in some cases, the solubility of the foaming agent. Control units 120 can operate differently at different locations along barrel 88. For example, a first portion of control units 120 may heat the stream at one or more locations along barrel 88, while a second portion of the control units 120 may cool the stream at one or more different locations along barrel 88.

A restriction element (not shown) may be provided upstream of foaming agent port 104 to maintain the SCF-laden polymeric material and foaming agent solution downstream of the restriction element at sufficient pressure throughout the injection process. The restriction element can take any of a variety of forms known in the art for restricting the upstream flow of polymer material, such as a blister, a dam across the feed-section of the screw, a reverse screw flight, a valve or a ring check valve.

In order to form a desired component, pellets 72 are deposited in hopper 100. A foaming agent in the form of a supercritical fluid, e.g., carbon dioxide or nitrogen, is provided by foaming agent source 106 to the injection molding machine 80. It is noted that other foaming agents may be used without deviating from the scope of the present invention. At the beginning of an injection cycle, screw 86 is axially positioned adjacent the first end of barrel 88 in an initial position. The pelletized SCF-laden polymeric material in hopper 100 is delivered into polymer processing space 90 in barrel 88 through orifice 102 and screw 86 is rotated to urge the SCF-laden polymeric material downstream. Supercritical gas, e.g. carbon dioxide or nitrogen, is introduced into polymer processing space 90 through at least one foaming agent port 104 where it is mixed with the SCF-laden polymeric material via screw 86. Screw 86 maintains sufficient back pressure at all times to prevent premature foaming or the loss of pressure within extruder 82 which would allow the single phase solution to return to a two phase solution. The single-phase solution of the second supercritical fluid and the SCF-laden polymeric material formed in extruder 82 has a very low viscosity which advantageously allows lower temperature molding, as well as, rapid filling of molds having close tolerances to form very thin molded parts. The polymeric material and foaming agent is accumulated in accumulation region 130 within barrel 88 downstream of screw 86.

Once a sufficient volume of the solution has accumulated in the accumulation region 130, screw 86 is moved in a downstream direction so as to inject the solution into nucleating pathway 92 through inlet 128 thereof. As the single-phase solution of the SCF-laden polymeric material and foaming agent passes through nucleating pathway 92, the pressure drop in the nucleating pathway 92 causes the nucleation of the solution. The nucleated SCF-laden polymeric material is injected into the molding chamber of mold 84 through outlet 132 of nucleating pathway 92. After injection, screw 86 once again rotates to build up the polymeric material (and foaming agent) in the accumulation region 130 for the next injection.

The nucleated SCF-laden polymeric material received in the molding chamber of mold 84 begins to cool as soon as the nucleated SCF-laden polymeric material contacts inner surface 84a of mold 84. The molding chamber of mold 84 is filled with the nucleated SCF-laden polymeric material and the nucleated SCF-laden polymeric material solidifies into a part as it cools. After a sufficient time period has passed, the cooled part may now be ejected from mold 84. As is conventional, the size and shape of the part corresponds to the size and shape of the molding chamber of mold 84. Mold 84 is opened and the part is ejected therefrom. Once the part is ejected, mold 84 is closed and the process may be repeated.

As described, the methodology of the present inventions allows for the introduction of two, highly controlled gases, in their supercritical states to create micron-sized voids in thin wall molded parts. The voids are created or nucleated as a result of homogeneous nucleation (or heterogeneous nucleation if fillers are present in the polymeric material) that occurs when a single-phase solution of the SCF-laden polymeric material and the supercritical fluid introduced into injection molding machine 80 pass through nucleating pathway 92. The fabrication of pellets 72 from the SCF-laden polymeric material and the introduction of a second supercritical fluid in the molding of a desired component yield a remarkable improvement in foam morphology. More specifically, the methodology of the present invention allow for the use of both nitrogen and carbon dioxide in the foaming process, thereby enabling the processing benefits and material characteristics of both blowing agents and yielding a component having features superior to a component fabricated using either nitrogen or carbon dioxide alone.

Figure 2:
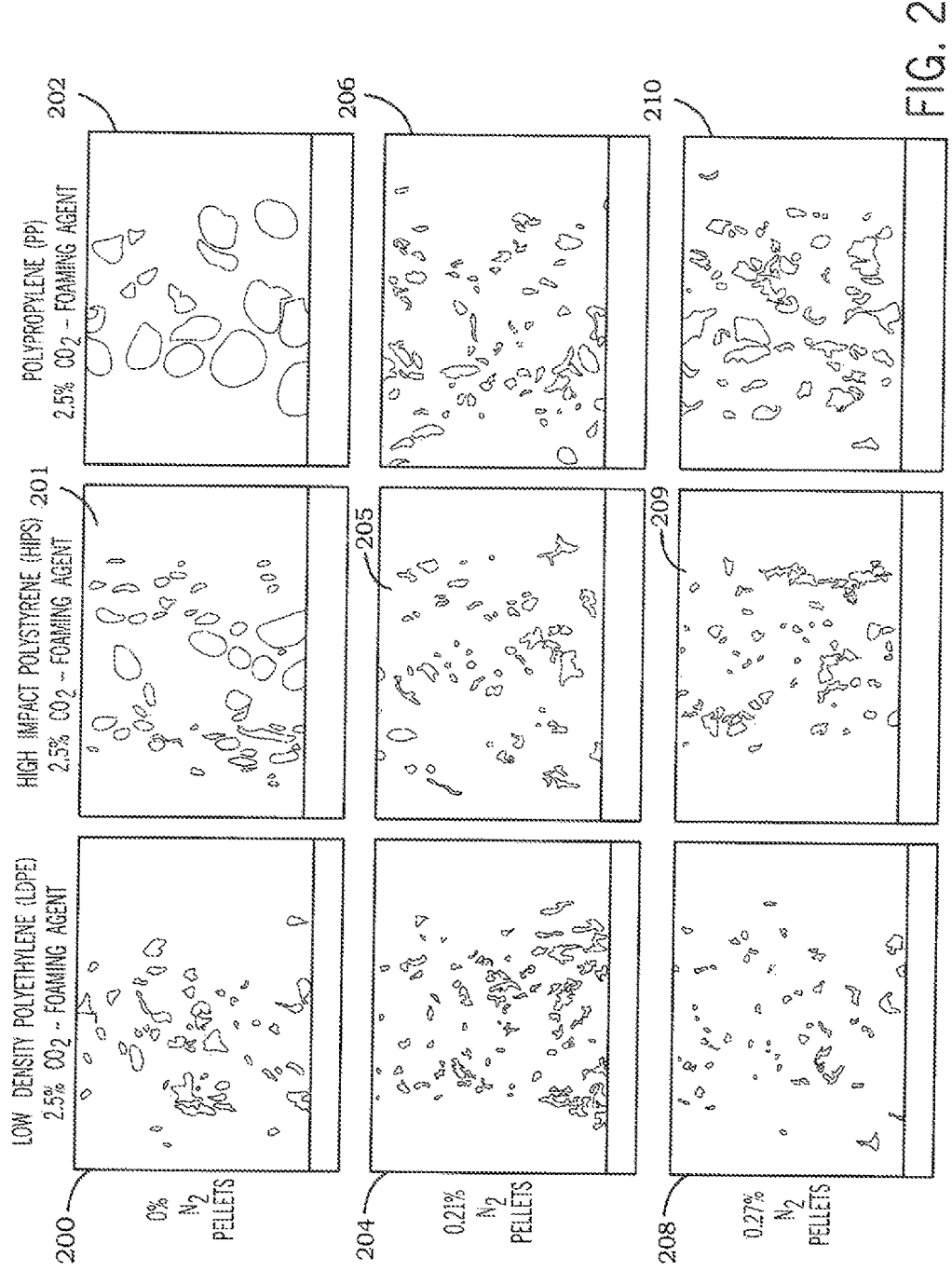
FIG. 2 is a representation of the morphology of components fabricated in accordance with the methodology of the present invention.

In order show the benefits of the methodology of the present invention, a series of components were injected molded utilizing pellets 72 fabricated from low-density polyethylene (LDPE), high impact polystyrene (HIPS) and polypropylene (PP) in accordance with the methodology heretofore described, wherein nitrogen ($N_2$) was used as the first supercritical fluid. The pelletized polymeric materials were laden with three different levels of nitrogen ($N_2$), namely, 0% $N_2$; 0.21% $N_2$; and 0.27% $N_2$. Constant percentages of carbon dioxide, namely, 2.5% $CO_2$ were introduced as the second supercritical fluids during the molding processes of the components. Referring to FIG. 2, components 200, 201 and 202 molded from pellets 72 formed from LDPE, HIPS and PP, respectively, without the addition of the supercritical nitrogen during the pellet fabrication processes, heretofore described, had large pore size and low cell density. However, components 204, 205 and 206 molded from pellets 72 formed from LDPE, HIPS and PP. respectively, and having 0.21% $N_2$ by weight show a sharp reduction in cell size and an increase in the cell density. Similarly, components 208, 209 and 210 molded from pellets 72 formed from LDPE, HIPS and PP, respectively, and having 0.27% $N_2$ by weight also showed a sharp reduction in cell size and an increase in the cell density. Hence, irrespective of the polymeric material used, it can be appreciated that the introduction of a first supercritical fluid during the pellet fabrication process coupled with the introduction of a second supercritical fluid during the injection molding process resulted in molded components having sharp reductions in cell size and increases in the cell density, as compared to the components wherein a single supercritical fluid was added to the polymeric material during the injection molding process.

Various modes of carrying out the invention are contemplated as being within the scope of the following claims particularly pointing and distinctly claiming the subject matter that is regarded as the invention.

We claim:

1. A method of fabricating an injection-molded component, comprising the steps of:
   introducing pellets including a first supercritical fluid and polymeric material into an injection barrel of an injection molding machine;
   plasticizing the pellets within the injection barrel;
   introducing a second supercritical fluid into the plasticized pellets to form an injection material: and
   injecting the injection material into a mold; wherein:
   the first supercritical fluid and the second supercritical fluid are formed from different components; and
   the first supercritical fluid is formed from nitrogen and the second supercritical fluid is formed from carbon dioxide.

2. The method of claim 1 comprising the additional steps of
   providing a polymeric material;
   heating the polymeric material and the first supercritical fluid to produce a melt;
   extruding the melt; and
   forming the pellets from the extruded melt.

3. The method of claim 2 wherein the extruded melt is unfoamed.

4. The method of claim 1 comprising the additional step of mixing the injection material prior to injecting the injection material into the mold.

5. The method of claim 1 wherein the injection molding machine includes a hopper communicating with the injection barrel and wherein the method includes the additional step of introducing the pellets into the hopper prior to introduction of the pellets into the injection barrel.

6. A method of fabricating an injection-molded component:
   comprising the steps of:
   providing a polymeric material;
   introducing a first supercritical fluid into the polymeric material;
   forming pellets from the polymeric material and the first supercritical fluid;
   introducing the pellets into an injection barrel of an injection molding machine:,
   plasticizing the pellets;
   introducing a second supercritical fluid into the plasticized pellets to form an injection material; and injecting the injection material into a mold; wherein:
the first supercritical fluid and the second supercritical fluid are formed from different components; and
the first supercritical fluid is formed from nitrogen and the second supercritical fluid is formed from carbon dioxide.

7. The method of claim 6 wherein the step of forming pellets from the polymeric material and the first supercritical fluid includes the additional steps of:
heating the polymeric material id introducing first supercritical fluid to produce a melt;
extruding the melt; and
introducing the melt into a pelletizer.

8. The method of claim 7 wherein the extruded melt is unfoamed.

9. The method of claim 6 comprising the additional step of mixing the second supercritical fluid into the plasticized material prior to injecting the injection material into the mold.

10. The method of claim 6 wherein the injection molding machine includes a hopper communicating with the injection barrel and wherein the method includes the additional step of introducing the pellets into the hopper prior to introduction of the pellets into the injection barrel.

11. A method of fabricating an injection-molded component, comprising the steps of
introducing pellets into an injection barrel of an injection molding machine, the pellets including a first supercritical fluid;
plasticizing the pellets in the injection barrel;
mixing a second supercritical fluid and the plasticized pellets to form a mixed material; and
injecting the mixed material into a mold;
wherein the first supercritical fluid and the second supercritical fluid are formed from different components.

12. The method of claim 11 further comprising the additional step of forming pellets from a polymeric material and the first supercritical fluid.

13. The method of claim 12 wherein the step of forming pellets from the polymeric material and the first supercritical fluid includes the steps of:
heating the polymeric material and introducing the first supercritical fluid to produce a melt;
extruding the melt;
cooling the extruded melt into solid strands; and
introducing the strands into a pelletizer.

14. The method of claim 13 wherein the extruded melt is unfoamed.

15. The method of claim 11 wherein the first supercritical fluid is formed from nitrogen and the second supercritical fluid is carbon dioxide.

16. The method of claim 11 wherein the first supercritical fluid is formed from nitrogen.

17. The method of claim 11 wherein the second supercritical fluid is formed from carbon dioxide.

18. The method of claim 11 wherein the injection molding machine includes a hopper communicating with the injection barrel and wherein the method includes the additional step of introducing the pellets into the hopper prior to introduction of the pellets into the injection barrel.

* * * * *